United States Patent
Kempe et al.

(10) Patent No.: US 10,302,138 B2
(45) Date of Patent: May 28, 2019

(54) SENSOR ARRANGEMENT AND ROLLING BEARING HAVING SUCH A SENSOR ARRANGEMENT

(71) Applicant: Schaeffler Technologies AG & Co. KG, Herzogenaurach (DE)

(72) Inventors: Fabian Kempe, Herzogenaurach (DE); Matthias Herbrich, Furth (DE); Dagmar Munch, Frankfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 233 days.

(21) Appl. No.: 15/310,982

(22) PCT Filed: Mar. 31, 2015

(86) PCT No.: PCT/DE2015/200226
§ 371 (c)(1),
(2) Date: Nov. 14, 2016

(87) PCT Pub. No.: WO2016/000694
PCT Pub. Date: Jan. 7, 2016

(65) Prior Publication Data
US 2017/0074327 A1    Mar. 16, 2017

(30) Foreign Application Priority Data
Jun. 30, 2014    (DE) .................. 10 2014 212 530

(51) Int. Cl.
*G01L 5/00* (2006.01)
*H02J 7/02* (2016.01)
(Continued)

(52) U.S. Cl.
CPC ............ *F16C 41/008* (2013.01); *G01D 11/30* (2013.01); *G01D 21/00* (2013.01); *G01L 5/0019* (2013.01);
(Continued)

(58) Field of Classification Search
CPC ..... F16C 41/008; F16C 2233/00; H02J 50/12; H02J 50/80; H02J 50/10; H02J 7/025;
(Continued)

(56) References Cited

U.S. PATENT DOCUMENTS 5,440,300 A * 8/1995 Spillman, Jr. ....... B60C 23/0444
250/227.21
6,484,582 B2 * 11/2002 Ehrfeld ................. F16C 19/522
384/448
(Continued)

FOREIGN PATENT DOCUMENTS

CN         101151528 A       3/2008
DE         10019539          10/2001
(Continued)

*Primary Examiner* — Jonathan M Dunlap
(74) *Attorney, Agent, or Firm* — Volpe and Koenig, P.C.

(57) ABSTRACT

The invention relates to a sensor arrangement on a rotary bearing which has a stationary bearing part and a rotatable bearing part. A primary coil is arranged on the stationary bearing part and is connected to a supply unit in a wired manner. A sensor circuit and a secondary coil supplying said circuit with electrical energy are fitted to the rotatable bearing part. According to the invention, the primary coil and the secondary coil are part of an energy transmission unit which is constructed according to the Qi standard. At least the operating energy for the sensor circuit, preferably also the data for communication between the sensor circuit and the supply unit, are transmitted via the inductive coupling between the primary coil and the secondary coil.

9 Claims, 1 Drawing Sheet

(51) Int. Cl.
*F16C 41/00* (2006.01)
*G01D 11/30* (2006.01)
*G01D 21/00* (2006.01)
*H01F 38/14* (2006.01)
*H02J 50/10* (2016.01)
*H02J 50/12* (2016.01)
*H02J 50/80* (2016.01)

(52) U.S. Cl.
CPC .............. *H01F 38/14* (2013.01); *H02J 7/025* (2013.01); *H02J 50/10* (2016.02); *H02J 50/12* (2016.02); *H02J 50/80* (2016.02); *F16C 2233/00* (2013.01); *H01F 2038/143* (2013.01)

(58) Field of Classification Search
CPC . G01L 5/0019; H01F 38/14; H01F 2038/143; G01D 21/00; G01D 11/30
USPC ............................. 307/104; 455/41.1; 73/862
See application file for complete search history.

(56) References Cited

U.S. PATENT DOCUMENTS

| | | | |
|---|---|---|---|
| 7,568,842 B2* | 8/2009 | Gempper | F16C 19/522 384/448 |
| 7,827,871 B2* | 11/2010 | Ehrfeld | G01K 13/08 73/862.322 |
| 8,880,359 B2* | 11/2014 | Ince | G01M 13/022 340/679 |
| 9,077,390 B1* | 7/2015 | Joehren | H04B 5/0037 |
| 9,094,536 B2 | 7/2015 | Allgaier | |
| 9,276,435 B2* | 3/2016 | Chen | H02J 7/025 |
| 9,385,787 B2* | 7/2016 | Toivanen | H02J 50/80 |
| 9,425,864 B2* | 8/2016 | Staring | H02J 5/005 |
| 9,453,780 B2* | 9/2016 | Erskine | F16C 41/004 |
| 2002/0050754 A1 | 5/2002 | Hakamata et al. | |
| 2003/0069051 A1 | 4/2003 | Pretre et al. | |
| 2006/0025897 A1 | 2/2006 | Shostak et al. | |
| 2006/0199620 A1 | 9/2006 | Greene et al. | |
| 2006/0257060 A1* | 11/2006 | Gempper | F16C 19/522 384/448 |
| 2008/0170817 A1* | 7/2008 | McDearmon | F16C 19/386 384/448 |
| 2009/0116775 A1 | 5/2009 | Oguma et al. | |
| 2012/0078537 A1* | 3/2012 | Ince | G01M 13/022 702/42 |
| 2012/0175969 A1 | 7/2012 | Maughan et al. | |
| 2014/0035383 A1 | 2/2014 | Riehl | |
| 2014/0253026 A1* | 9/2014 | Du | H02J 5/005 320/108 |
| 2015/0168257 A1* | 6/2015 | Erskine | F16C 41/004 384/448 |
| 2015/0311954 A1* | 10/2015 | Tetsuka | H04B 5/0081 307/104 |

FOREIGN PATENT DOCUMENTS

| | | |
|---|---|---|
| DE | 102006015111 | 10/2007 |
| DE | 102012015000 | 1/2014 |
| EP | 1927855 | 6/2008 |
| EP | 2709231 | 3/2014 |
| KR | 101299858 | 6/2013 |
| KR | 101365521 | 6/2013 |
| KR | 20130064872 | 6/2013 |
| KR | 20130067393 | 6/2013 |
| WO | 2014020464 | 2/2014 |

* cited by examiner

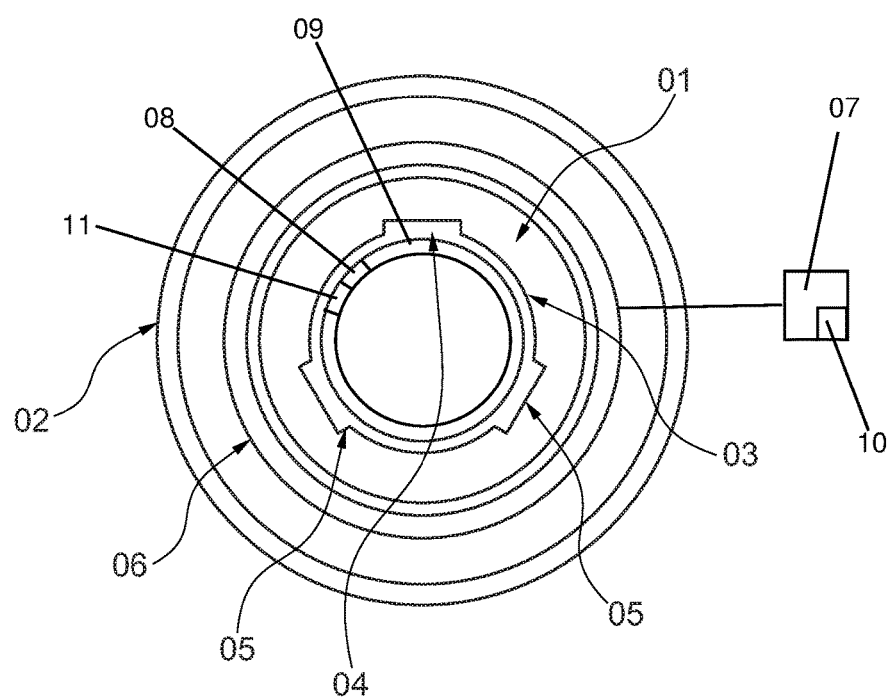

SENSOR ARRANGEMENT AND ROLLING BEARING HAVING SUCH A SENSOR ARRANGEMENT

BACKGROUND

The wireless transmission of energy is attractive for many applications in the field of electronics. Energy is transmitted from a transmitter to a receiver based on an inductive, capacitive, or electromagnetic principle. In this way, electrical components or electrical circuits can be supplied with an energy needed for operation if cables and electrical contacts cannot be used.

The most common principle is inductive energy transmission. Typical applications are, for example, chargers for cellular phones, cameras, and electric toothbrushes. This form of wireless energy transmission is also used, however, for electric vehicles and in medical technology for implants or sensors. In principle, the inductive transmission is suitable primarily for applications that allow a small distance between the transmitter and the receiver and have low energy consumption.

For the inductive energy transmission principle, similar to the working principle of a transformer, a variable electromagnetic field is generated in a transmitter coil carrying an alternating current. Due to the variable electromagnetic field received by a receiver coil of the receiver, a voltage is induced in the receiver coil. Due to the load connected to the receiver coil, a current flow is generated by the induced voltage and power is transmitted.

From practice, numerous methods and various applications of wireless energy transmission are known.

U.S. 2014/035383 A1 shows a dual mode receiver for the wireless reception of energy. The receiver comprises an electromagnetic resonator and a receiver coil. A matching network is made up of passive components. The action radius of the electromagnetic resonator includes a first selective low frequency range and a second selective high frequency range, so that an active circuit can be operated in both frequency ranges.

U.S. 2006/0199620 A1 shows a method, a device, and a system for energy transmission. The device comprises a plurality of transmitters that transmit pulse-like energy to a receiver in order to power a load. Here, the receiver needs no DC-DC converter. The transmitter comprises an antenna that communicates with a pulse generator. The pulse generator transmits the pulses of the transmitter. The transmitted current pulses are used only for energy transmission and not for data transmission.

In applications for determining a physical measuring variable by sensors, the wireless transmission of data is a frequently used alternative to often expensive structures with a cable.

DE 100 19 539 A1 shows a sensor with wireless energy supply and a method for wireless energy transmission. A sensor unit has an oscillating circuit consisting of a capacitor and a coil for measurements, for the reception of electromagnetic waves, and for the formation of a sensor signal. By the use of a converter or a filter, a separation of the sensor signal into a feed component and a usable signal component is achieved. The sensor is supplied with energy electrically during the measuring process.

In DE 10 2006 015 111 A1, a rotating bearing is shown with two bearings parts that move opposite each other and between which there is lubricating grease. The lubricant properties are monitored by a lubricant sensor that has at least one piezoelectric element. The lubricant sensor is connected to an evaluation device by signal transmission paths. The signal transmission can take place over wires or a wireless transmission path. The sensors should be supplied with energy from an evaluation device, but it is not specified how this can take place for wireless signal transmission.

U.S. 2002/050754 A1 shows a bearing with a non-contact signal transmission mechanism. A ring magnet is mounted on an outer ring of the bearing by a magnet retaining unit. A coil retaining unit with a generator coil is arranged on an inner ring and turned toward the ring magnet. A structural unit with a transmission circuit and a loop antenna is connected to the coil retaining unit. The rotation of the inner ring causes the generator to produce current. The generated energy is fed to a transmission circuit. An output signal of a sensor is transmitted through the transmission circuit as a low-energy wave via the loop antenna and received by a stationary side.

DE 10 2012 015 000 A1 shows an electric installation device with a charging station for mobile devices. A charging shell comprises a primary charging coil that is connected to a power source with a processing and control unit. A secondary charging coil of the mobile device is provided with energy through inductive energy transmission.

Due to more and more mobile devices that are powered by rechargeable energy sources, there is a plurality of charging devices for wireless energy transmission with different technical features. The consumer is uncomfortably confronted with this plurality of devices that also require different cables. As a reaction to the need for simplification and standards, a collection of companies, the Wireless Power Consortium, has been formed and has developed the so-called Qi standard for interoperability of devices, especially charging devices. The details of this standard are available, for example, at: http://www.wirelesspowerconsortium.com/developers/specification.html Qi technology allows the wireless inductive transmission of energy in a low-power range of up to 5 W in a transmission frequency range from 110 Hz to 205 Hz and at an operating voltage of the transmitter of 19 V. The transmitter-receiver coils have a planar design and are typically arranged at a distance of 5 mm opposite each other. The basic configuration for Qi technology provides a base station with a transmission coil that transmits energy to a receiver unit with a receiver coil. Here, the receiver unit is regularly coupled with an accumulator to charge it electrically. The receiver unit also communicates unidirectionally with the transmitter unit over allocated monitoring units to be able to perform specific power matching through load modulation.

EP 2 709 231 A1 shows an energy supply system for a field device connected to a wired network. The energy supply system is equipped with a radio module for data communications with an external unit. The radio module is connected to the field device and has a power supply. A power supply adapter comprises an energy transmitter for wireless energy transmission. A power supply unit comprises an energy receiver that is coupled inductively with the energy transmitter. Energy transmitters and energy receivers correspond to the Qi standard.

WO 2014/020464 A2 shows an operating method for an inductive energy transmission from a transmitter to a receiver by means of a power signal, wherein the energy transmission system is compatible with the Qi standard. The energy transmission system provides expanding the unidirectional communication of the receiver with the transmitter corresponding to the Qi standard and enabling communications, starting from the transmitter, between the transmitter and receiver. Here, the communications are based on a load modulation of the power signal.

SUMMARY

The objective of the present invention consists in, starting from the prior art, providing a simplified and economical sensor arrangement that can be realized on a rotating part, in particular, a rotating bearing, which permits the use of different sensors and the monitoring of different physical parameters and which enables the monitoring of rotating parts and simultaneously eliminates the use of sliding contacts.

This objective is achieved by a sensor arrangement according to the invention.

The sensor arrangement according to the invention is preferably realized on a rotating bearing that comprises a stationary bearing part and a rotating bearing part. Typically, it is a rolling bearing with bearing inner ring, bearing outer ring, and rolling bodies arranged in-between, but other bearing types are not ruled out. In general, the invention could be realized on all rotating parts that are supported for rotation.

A primary coil that is wired to a supply unit is mounted on or connected to the stationary bearing part. The supply unit can be positioned directly on the bearing, on the bearing housing, or also at a distance from these parts. The supply unit delivers an alternating primary current to the primary coil, so that this forms an electromagnetic alternating field. The primary coil is arranged so that it surrounds the rotating part, preferably is arranged concentric to this part.

On the rotating part or bearing part there is a sensor circuit and a secondary coil supplying said sensor circuit with electrical energy. The secondary coil is located in the alternating field of the primary coil, so that a secondary voltage is induced in it and a current power can flow to the sensor circuit. The secondary coil is preferably oriented concentric to the primary coil and surrounds the rotating part. In a known way, power supply components are present that generate an operating voltage needed for the sensor circuit from the secondary voltage.

To produce compatibility with distributed, economical components, primary coils and secondary coils are built as components of an energy transmission unit that operates according to the Qi standard. The Qi standard defines both electrical and also structural parameters that should be adhered to in the design of the present sensor circuit, but do not have to be described here in more detail. In an especially preferred way, the primary coil and secondary coil do not function only for the energy transmission but also for the data transmission that likewise takes into account the conditions of the Qi standard. Also conceivable, however, are other types of wireless communications for transmitting sensor data from the rotating bearing part to the stationary bearing part.

Through the use of the inductive coupling between the primary and secondary coil, according to the invention at least the operating energy for the sensor circuit, but preferably also the data for communications between the sensor circuit and the supply unit, are transmitted. With respect to the specific data to be transmitted, a preferred embodiment uses the Qi standard, but also transports other contents, because not only load and operating data required for the charging of an accumulator is transmitted. It is essential that the measured values recorded by the sensor on the bearing are transmitted wirelessly to the stationary supply unit, in order to provide for further data processing from there.

One essential advantage of the invention is that it enables the wireless energy supply of a variable bearing sensor system and simultaneously the data transmission from the sensor to an arbitrary electronics system. The energy supply is realized with the help of the fully developed Qi standard, even though this has not been previously used in the field of sensor systems. Therefore it is possible to place economical, reliable, and standardized sensor components on moving bearing parts.

According to a preferred embodiment, the primary coil of the sensor arrangement extends along the circumference of a stationary bearing ring, while the rotating bearing part with the secondary coil mounted on it is located within the primary coil. In this case, the primary coil can have a significantly larger cross section than the secondary coil, so that the energy transmission can be realized efficiently. For a rotationally symmetric construction of the primary and secondary coil, the energy and data transmission is independent of the respective angle position of the rotating bearing part. Because the Qi standard is used, the energy supply of the sensor is also guaranteed when the rotating bearing part is stationary, so that, for example, before a supported arrangement is started up, the state parameters of the bearing can be queried.

In one especially preferred embodiment of the sensor arrangement, the rotating bearing part is the inner ring of a rolling bearing, while the stationary bearing part is the outer ring of the rolling bearing. The primary coil is preferably mounted on the outside of the outer ring. The secondary coil is mounted on the inside of the inner ring. The running surfaces of the rolling bearing are thus not interfered with by the sensor arrangement. If the bearing rings are made from ferromagnetic material, it is useful to ensure a distance between the iron material and the coils, in order to not too greatly adversely affect the alternating fields generated by the coils, because this degrades the energy transmission.

In the modified embodiments, the secondary coil can be mounted on a rotating shaft or a comparable part, while the primary coil is mounted, for example, between two bearings on the bearing housing, in order to surround the secondary coil concentrically.

Preferably the sensor circuit and the secondary coil are mounted on a flexible carrier that carries, for example, a film made from polyvinylidene fluoride (PVDF) for realizing the sensor. In particular, it is useful if the flexible carrier is mounted on the inside of the inner ring of the rolling bearing.

In principle, any sensors could be used, because it is possible to provide an active power supply of the sensor circuit. Thus, by use of known sensors, for example, forces, wear values, rotational speeds, temperatures, viscosity values of the lubricant, or other parameters influencing the operational capability of the bearing can be monitored. According to one embodiment, the sensor circuit comprises a strain sensor that is applied onto the flexible carrier.

It is preferable if the supply unit comprises a first microprocessor that supplies the primary voltage to the primary coil and thus controls the provision of the supply energy. Preferably, the supply unit also imbeds all of the control data that is to be transmitted to the sensor circuit onto the primary current fed into the primary coil. For example, this control data can contain an ID address of the respective sensor, in particular, if multiple sensors are allocated to the sensor circuit. Furthermore, calibration data or data of external units can be transmitted if this is required for the ordinary operation of the sensor circuit or the evaluation of the measured values supplied by the sensor. The supply unit also monitors a counter induction that occurs in the primary coil and is triggered by a changing secondary current that is impressed on the secondary coil and represents the response data from the sensor circuit. The supply unit filters out this response data and provides it for subsequent processing. For this data transmission, preferably the Qi standard specifications are taken into account, but other known forms of wireless communications could also be used.

According to one preferred embodiment, the sensor circuit has a second microprocessor that processes the measured values supplied by the sensor and delivers the already mentioned response data in the form of a data-modulated secondary current to the secondary coil.

The objective of the invention is also achieved by a rolling bearing with a stationary bearing part and a rotating bearing part and also the sensor arrangement explained above.

BRIEF DESCRIPTION OF THE DRAWINGS

Other advantages and details of the invention are given from the embodiment described below with reference to the accompanying drawing.

FIG. 1 shows a basic cross-sectional diagram of a rolling bearing arranged in a bicycle bottom bracket.

DETAILED DESCRIPTION OF THE PREFERRED EMBODIMENTS

FIG. 1 shows, in cross section, a rolling bearing 01 that is part of a bicycle bottom bracket. The bicycle bottom bracket is arranged in a frame tube 02. A flexible carrier 03 is mounted on the inside of an inner ring of the rolling bearing 01. The carrier 03 provides a surface for forming one or more sensors, for example, for a strain sensor and a temperature sensor that determine the mechanical strains and temperatures on the bearing inner ring. The sensors are connected to other components to form a sensor circuit 08 by electrical conductors formed on the carrier 03. The other components are arranged here on a circuit board base 04.

Two support bases 05 are also formed on the carrier 03. Finally, the carrier 03 supports a secondary coil 09 that provides the sensor circuit 08 with the necessary energy with a current generated in this coil. The sensor circuit 08 also delivers response data to the secondary coil 09 for a wireless, inductive data transmission to a primary coil 06 that is arranged on the outside of the stationary outer ring of the rolling bearing.

The primary coil 06 is connected electrically to a supply unit 07 and is fed by this unit. The primary coil 06 and secondary coil 09 are thus part of an energy and data transmission unit that is formed according to the Qi standard. By utilizing the induction coupling defined in more detail in the Qi standard, the energy required for the sensor circuit 08 is transmitted from the primary coil 06 to the secondary coil 09. In addition, a bidirectional data transmission between these two coils is realized in the way described above. The supply unit 07 comprises a first microprocessor 10 that controls preparation of supply energy to the primary coil 06, imbeds control data onto a current fed into the primary coil 06, monitors a counter induction occurring in the primary coil 06, and processes response data from the sensor circuit 08. The sensor circuit 08 comprises a second microprocessor 11 that processes measured values supplied by the sensor and delivers response data to the secondary coil 09.

LIST OF REFERENCE NUMBERS

01 Roller bearing
02 Frame tube
03 Flexible carrier
04 Circuit board base
05 Support bases
06 Primary coil
07 Supply unit
08 Sensor circuit
09 Secondary coil
10 First microprocessor
11 Second microprocessor

The invention claimed is:

1. A sensor arrangement comprising, a stationary part on which a primary coil is arranged that is connected with wires to a supply unit, a rotating part on which a sensor circuit and a secondary coil supplying said sensor circuit with electrical energy are mounted, the primary coil surrounds the rotating part with a ring-shape, the secondary coil is arranged concentrically within the primary coil, and the primary and secondary coils are part of an energy transmission unit that operates according to a Qi standard, and at least an operating energy for the sensor circuit is transmitted via an inductive coupling between the primary and secondary coils, and the stationary part is an outer ring of a rolling bearing and the primary coil is mounted on an outside of the outer ring.

2. The sensor arrangement according to claim 1, wherein the inductive coupling is configured for communication of data between the sensor circuit and the supply unit by transmission of the data between the primary and secondary coils.

3. The sensor arrangement according to claim 1, wherein the primary coil extends along a circumference of a stationary bearing part with a ring-shaped cross section as the stationary part and the secondary coil is mounted on a rotating bearing part as the rotating part.

4. A sensor arrangement comprising, a stationary part on which a primary coil is arranged that is connected with wires to a supply unit, a rotating part on which a sensor circuit and a secondary coil supplying said sensor circuit with electrical energy are mounted, the primary coil surrounds the rotating part with a ring-shape, the secondary coil is arranged concentrically within the primary coil, and the primary and secondary coils are part of an energy transmission unit that operates according to a Qi standard, and at least an operating energy for the sensor circuit is transmitted via an inductive coupling between the primary and secondary coils, wherein the sensor circuit and the secondary coil are mounted on a flexible carrier that is connected to the rotating part.

5. The sensor arrangement according to claim 4, wherein the flexible carrier is mounted on an inside of an inner ring of a rolling bearing.

6. The sensor arrangement according to claim 5, wherein the sensor circuit comprises a strain sensor that is mounted on the flexible carrier.

7. A sensor arrangement comprising, a stationary part on which a primary coil is arranged that is connected with wires to a supply unit, a rotating part on which a sensor circuit and a secondary coil supplying said sensor circuit with electrical energy are mounted, the primary coil surrounds the rotating part with a ring-shape, the secondary coil is arranged concentrically within the primary coil, and the primary and secondary coils are part of an energy transmission unit that operates according to a Qi standard, and at least an operating energy for the sensor circuit is transmitted via an inductive coupling between the primary and secondary coils, wherein the supply unit comprises a first microprocessor that controls preparation of supply energy to the primary coil, imbeds control data onto a current fed into the primary coil, monitors a counter induction occurring in the primary coil, and processes response data from the sensor circuit.

8. The sensor arrangement according to claim 7, wherein the sensor circuit comprises a second microprocessor that processes measured values supplied by the sensor and delivers response data to the secondary coil.

9. A rolling bearing comprising a stationary bearing part, a rotating bearing part, and the sensor arrangement according to claim 7, wherein the stationary bearing part is the stationary part, and the rotating baring ring is the rotating part.

\* \* \* \* \*